United States Patent
Peterson et al.

(10) Patent No.: US 10,287,009 B2
(45) Date of Patent: May 14, 2019

(54) HELICOPTER BLADE FOLDING APPARATUS

(71) Applicant: Alion Science and Technology Corporation, McLean, VA (US)

(72) Inventors: Eric Peterson, St. Croix Falls, WI (US); Jeremiah Schweitzer, Grantsburg, WI (US); Zachary Anderson, Grantsburg, WI (US)

(73) Assignee: ALION SCIENCE AND TECHNOLOGY CORPORATION, McLean, VA (US)

( * ) Notice: Subject to any disclaimer, the term of this patent is extended or adjusted under 35 U.S.C. 154(b) by 515 days.

(21) Appl. No.: 15/158,180

(22) Filed: May 18, 2016

(65) Prior Publication Data

US 2016/0368598 A1    Dec. 22, 2016

Related U.S. Application Data

(60) Provisional application No. 62/163,662, filed on May 19, 2015.

(51) Int. Cl.
*B64C 27/50* (2006.01)
(52) U.S. Cl.
CPC .................. *B64C 27/50* (2013.01)
(58) Field of Classification Search
CPC . B64C 27/50; B64C 2201/102; B64C 27/022; B64C 11/28; B64C 3/56;

(Continued)

(56) References Cited

U.S. PATENT DOCUMENTS

| 2,549,886 A | * | 4/1951 | Buivid | .................... B64C 27/50 244/17.11 |
| 3,097,701 A | * | 7/1963 | Buivid | .................... B64C 27/50 416/143 |

(Continued)

FOREIGN PATENT DOCUMENTS

| FR | 2817830 A1 | * | 6/2002 | ............. B64C 27/50 |
| WO | WO 8002408 A1 | * | 11/1980 | ............. B64C 27/50 |

OTHER PUBLICATIONS

International Search Report for corresponding PCT Appln. No. PCT/US16/33090 dated Dec. 1, 2016.

*Primary Examiner* — Logan Kraft
*Assistant Examiner* — Brian Delrue
(74) *Attorney, Agent, or Firm* — Fox Rothschild LLP (57) ABSTRACT

The present invention relates to a blade folding apparatus that may incorporate an overhead blade lifting system that reduces binding loads on blade pins induced by blade weight and pitch, and a folding mechanism that removes the necessity of personnel with external guide-poles to rotate main rotor blades. The apparatus may include flap locks, an overhead lifting system support structure attached to the flap locks, and two blade support beams to create and support a lifting point near each blade's longitudinal and lateral center of gravity. The blade support beams may be fitted with an articulation mechanism that lifts and/or lowers the overhead lifting structure. The apparatus facilitates rapid folding of the main rotor blades, and, when used with blade clamping mechanisms, is capable of aiding in the removal and/or the re-installation of the main rotor blades without external lifting mechanisms.

10 Claims, 9 Drawing Sheets

(58) Field of Classification Search
CPC ......... B64C 9/34; B64C 27/37; B64C 27/473; B64C 2201/20
USPC .................................................. 416/142, 143
See application file for complete search history.

(56) References Cited

U.S. PATENT DOCUMENTS

| | | | | |
|---|---|---|---|---|
| 3,241,791 A * | 3/1966 | Piasecki | ................... | B64C 27/82 244/17.19 |
| 3,967,918 A * | 7/1976 | Mouille | ................... | B64C 27/35 416/141 |
| 4,012,169 A * | 3/1977 | Mouille | ................... | B64C 27/33 416/134 A |
| 4,215,587 A * | 8/1980 | Kisovec | ................... | B64C 1/30 244/120 |
| 4,268,222 A * | 5/1981 | Bernard | ................... | B64C 27/50 416/1 |
| 4,301,982 A * | 11/1981 | Tiemann | ................... | B64C 27/50 244/17.11 |
| 4,712,978 A * | 12/1987 | Tiemann | ................... | B64C 27/50 416/1 |
| 4,738,592 A * | 4/1988 | Cavanaugh | ............ | B64C 27/50 416/140 |
| 5,211,538 A * | 5/1993 | Seghal | ................... | B64C 27/50 244/17.11 |
| 5,249,926 A * | 10/1993 | D'Anna | ................... | B64C 27/50 416/142 |
| 5,951,252 A | 9/1999 | Muylaert | | |
| 6,032,899 A * | 3/2000 | Mondet | ................... | B64C 27/50 244/17.25 |
| 6,036,442 A * | 3/2000 | Certain | ................... | B64C 27/50 416/143 |
| 6,213,712 B1 * | 4/2001 | Muylaert | ................ | B64C 27/50 416/1 |
| 6,568,644 B2 * | 5/2003 | Pedersen | ................... | B62J 7/08 224/309 |
| 6,783,327 B1 * | 8/2004 | Davis | ................... | B64C 27/50 416/1 |
| 6,793,186 B2 * | 9/2004 | Pedersen | ................ | B60R 9/048 224/309 |
| 6,860,450 B2 * | 3/2005 | Muylaert | ................ | B64C 27/50 244/17.11 |
| 7,530,790 B2 * | 5/2009 | Cabrera | ................... | B64C 27/10 416/134 A |
| 7,744,349 B1 * | 6/2010 | Dunmire | ................... | B64C 27/50 416/107 |
| 7,857,590 B1 * | 12/2010 | Neal | ....................... | B64C 27/50 416/134 A |
| 7,980,522 B2 * | 7/2011 | Anderson | ................ | B25B 5/14 244/17.11 |
| 9,285,068 B2 * | 3/2016 | Phelan | ..................... | F16M 9/00 |
| 9,421,673 B2 * | 8/2016 | Dunmire | ............... | B64C 27/006 |
| 2005/0211825 A1 | 9/2005 | Hoynash | | |
| 2013/0280076 A1 * | 10/2013 | Kuntze-Fechner | ..... | B64C 27/33 416/204 R |
| 2015/0225077 A1 * | 8/2015 | Dunmire | ............... | B64C 27/006 248/316.5 |
| 2017/0241474 A1 * | 8/2017 | Jenkins | ..................... | B25J 1/04 |
| 2018/0093761 A1 * | 4/2018 | Littlejohn | ............. | B64C 27/473 |

* cited by examiner

HELICOPTER BLADE FOLDING APPARATUS

CROSS-REFERENCE TO RELATED APPLICATION

This application claims the benefit of the filing date under 35 USC 119(e) of U.S. Provisional Application entitled "Helicopter Blade Folding Apparatus," Ser. No. 62/163,662 filed May 19, 2015, the entire contents of which are incorporated herein by reference.

STATEMENT REGARDING GOVERNMENT SUPPORT

Some of the information disclosed herein may be determined to relate to inventions made with Government support and to the extent any such information ultimately becomes the subject of allowed claims, the Government may have certain rights in those claimed inventions.

BACKGROUND OF THE INVENTION

Field of the Invention

This invention pertains to the folding and unfolding of helicopter blades.

Description of the Prior Art

It is an accepted and necessary design feature of helicopters to have a large diameter swept area of the main rotor blades. This feature, however, causes significant space claim issues when the helicopter is not in use or needs to be transported long distances in transport aircraft or on the crowded deck of sea going vessels, which is often the case. To reduce the space claim of the helicopter to be stored or transported, the main rotor blades are either removed or folded so that the longitudinal axis of the blades are nearly parallel to the longitudinal axis of the fuselage of the helicopter.

To ensure that the balance of each rotor remains intact, it is not desirable to the operation of individual helicopters to have their main rotor blades removed at any time. Removing the blades from a host helicopter requires that the helicopter go through lengthy and complex rebalancing procedures before flying once again. It is therefore highly desirable to produce a main blade fold system that allows for retention of the blades with a minimum of effort and time and risk of damage to the host aircraft or the blades.

The main rotor blade folding procedures are designed so that each helicopter can have its blades completely folded and stored, locked on the fuselage without the aid of power tools or external lifting equipment. To facilitate this operation, a "blade fold kit" is provided to helicopter transport personnel that contain all the manual tools, fixtures and lifting devices to manually fold the blades and secure them to the host helicopter fuselage in a minimum of time with a minimum of effort. The same "blade fold kit" must be used to "unfold" the blades and restore the blades to their original flight position without damage, in the least amount of time possible.

Devices for the automatic folding, i.e., without manual intervention, of the main rotor blades of a helicopter are already known. These devices, powered by hydraulic, pneumatic and/or electrical automatic folding devices are quite complex and their extensive weight and complexity prevent them from being incorporated on a wide scale on lightweight civilian and military helicopters.

Devices permitting the manual folding of the main rotor blades of a helicopter, as described above, are also known. These manual "blade fold kits" are simpler and more reliable than automatic or semi-automatic folding devices. Because they are provided as "kits" to be used only when helicopter main rotor blades require folding or unfolding for storage or transport, no additional permanent weight is added to the helicopter.

Various such devices have been developed for folding the main rotor blades, specifically multi-blade helicopters with three or more blades, each blade of which necessarily comprises of a flapping hinge and a hinge for controlling the angle of incidence. These rotors have thus presented the necessity of locking the flapping hinge and the rotational hinge during transportation in order to prevent any movement of each of the main rotor blades about these hinges.

Devices describing manual blade folding devices for helicopters with three or more blades include U.S. Pat. No. 6,213,712, in which the inventor describes a device to control the pitch and flap angles of the main rotor blades, and further describes device features to enable the folding of the blades rearward without damage. In U.S. Pat. No. 6,860,450, in which the inventors describe a method for folding the blades of an Apache Helicopter (AH-64) which has four main rotor blades, similar features are disclosed. In both of these and other inventions, however, only passing reference is made to the removal of one or both of the flight blade pins at the pitch housing and connection point of the blade, and the attachment of a "pole" at or near the outboard end of each blade to control the position of the blade.

In practice, it has been discovered that the process of preparing the blades to be folded includes the removal of one flight blade pin and then removing the other during the process. Because the helicopter blades are not supported or controlled at or near the center of gravity for this operation, and only at the far end through the use of a "pole" attached to the outboard end of the blade and manually manipulated by two or more personnel, achieving balance enough to remove the forces present at the blade pins is very difficult and time consuming. This occurs not only during the fold process, but again at the unfold process when the transport blade pins are removed and replaced with the flight blade pins as the main rotor blades are returned to their proper flight ready position.

It is a common occurrence during a main rotor blade fold or main rotor blade unfold operation of the Apache Helicopter, for example, that as many as eleven people are required for the fold and unfold operations, and the time and effort required to manipulate the outward end of each main rotor blade correctly to achieve what is commonly known as the "sweet spot," and at that moment relieving stress at the rotor blade pins sufficiently to remove the flight blade pin(s) is quite high and unacceptable.

SUMMARY OF THE INVENTION

In one of its aspects, this invention may provide, for example, an improved method for supporting main rotor blades for folding the blades attached to a pitch control housing, integrated with an improved method for controlling flap. This exemplary embodiment of the invention permits improved control for balanced control of the blades, resulting in a less difficult and more controlled folding of the main rotor blades without use of a pole at the far or outer end of the blades. The invention further describes, for example, an apparatus permitting positive control of the flap of the pitch control housing, thereby reducing stress and loads transmitted to and through the blade pins. Combined and as an integral part of the invention apparatus, this invention may, for example, allow for rapid and easy removal of the blade pins and other items required for same and quick blade fold and unfold procedures with reduced personnel requirement and workload. This invention may further include, using an appropriate blade clamping mechanism herein described, a method for easy removal of main rotor blades in the field with the potential elimination of the need for external equipment otherwise required for said removal. One object of this invention includes, for example, providing sufficient balanced control from the top of the helicopter to allow for safe and efficient complete blade control for both folding and removal as may potentially be required.

As another aspect of this invention, the described mechanism may include, for example, a series of rapidly attachable "pitch lock" or flap lock assemblies, that together may form a flap lock system, that are easily attached to the rotor hub of the helicopter during a blade fold or unfold operation that remain in place for transport or storage, and are fully removed prior to flight after the blades have been restored to flight position. In certain embodiments, these mechanisms may be attached to the hub using quick release pins and a piston-style toggle clamping mechanism, requiring no external tools for attachment. Furthermore, the use of this invention may lead to a reduction or elimination of loose parts for assembly or disassembly, reducing the possibility of Foreign Object Damage (FOD).

As a further aspect of certain embodiments of this invention, and in potential addition to the flap lock assemblies, an overhead lifting system support structure may be attached to the flap lock assemblies using similar quick-lock pins or other fasteners. This overhead lifting system support structure then attaches to a blade support beam assembly that is used to attach to a blade using an appropriate blade clamp and then used to lift or lower the main rotor blades as necessary to remove loads transmitted to the blade pins because of their static weight and other forces.

As a further or alternative aspect of the invention, the entire flap lock and overhead lifting system support mechanism may be very low weight and easily assembled around the mast with mast mounted equipment, such as when the Apache's Fire Control Radar (FCR) is in place without interference or damage to either the aircraft or the FCR.

As a further aspect or alternative of this invention, adjustable blade support beams may be quickly installed on the overhead lifting system support structure using similar quick-lock pins. These beams can be modular and can be assembled in place because of their light weight and quick-connect design and modularity. They may be designed in a manner that allows for the attachment of a blade clamp at or near the blade center of gravity (CG) points for maximum control using an included and adjustable connecting rod.

As a further aspect of this invention, there may be provisions for two separate blade support beams, or "booms," to be attached to the overhead lifting system support structure simultaneously. In a certain embodiment of the invention, a port side boom capable of supporting and controlling both the fore and aft port side blades and a starboard side boom capable of supporting and controlling both the fore and aft side blades may be included.

As a further aspect of this invention, blade clamps may, for example, be attached to each individual main rotor blade at CG of each blade, thereby allowing the control and folding of both aft blades at the same time and both fore blades at the same time.

As a further aspect of this invention, the described invention may be used with other "blade fold kits" as it describes an improved method and apparatus for the control of helicopter main rotor blades in preparation for folding or unfolding or removal of blades. The invention may also include a blade clamp.

DESCRIPTION OF CERTAIN PREFERRED EMBODIMENTS OF THE INVENTION

Embodiments of the present invention are not limited to the particular methodology, uses, and applications described herein, as these may vary. It is also to be understood that the terminology used herein is used for the purpose of describing particular embodiments only, and is not intended to limit the scope of all embodiments of the present invention. It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art. Similarly, for another example, a reference to "a step" or "a means" is a reference to one or more steps or means and may include sub-steps or subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Unless defined otherwise, all technical and scientific terms used herein have the same meanings as commonly understood by one of ordinary skill in the art to which this invention belongs. Preferred methods, techniques, devices and materials are described although any methods, techniques, devices, or materials similar or equivalent to those described may be used in the practice or testing of the present invention.

All patents and other publications discussed are incorporated herein by reference for the purpose of describing and disclosing, for example, the methodologies described in such publications that might be useful in connection with the present invention. These publications are provided solely for their disclosure prior to the filing date of the present application. Nothing in this regard should be construed as an admission that the inventors are not entitled to antedate or otherwise remove any such publication or patent as prior art for any reason.

Referring now to the drawings, wherein the reference characters designate identical or corresponding part throughout the several views and embodiments.

Figure 1:
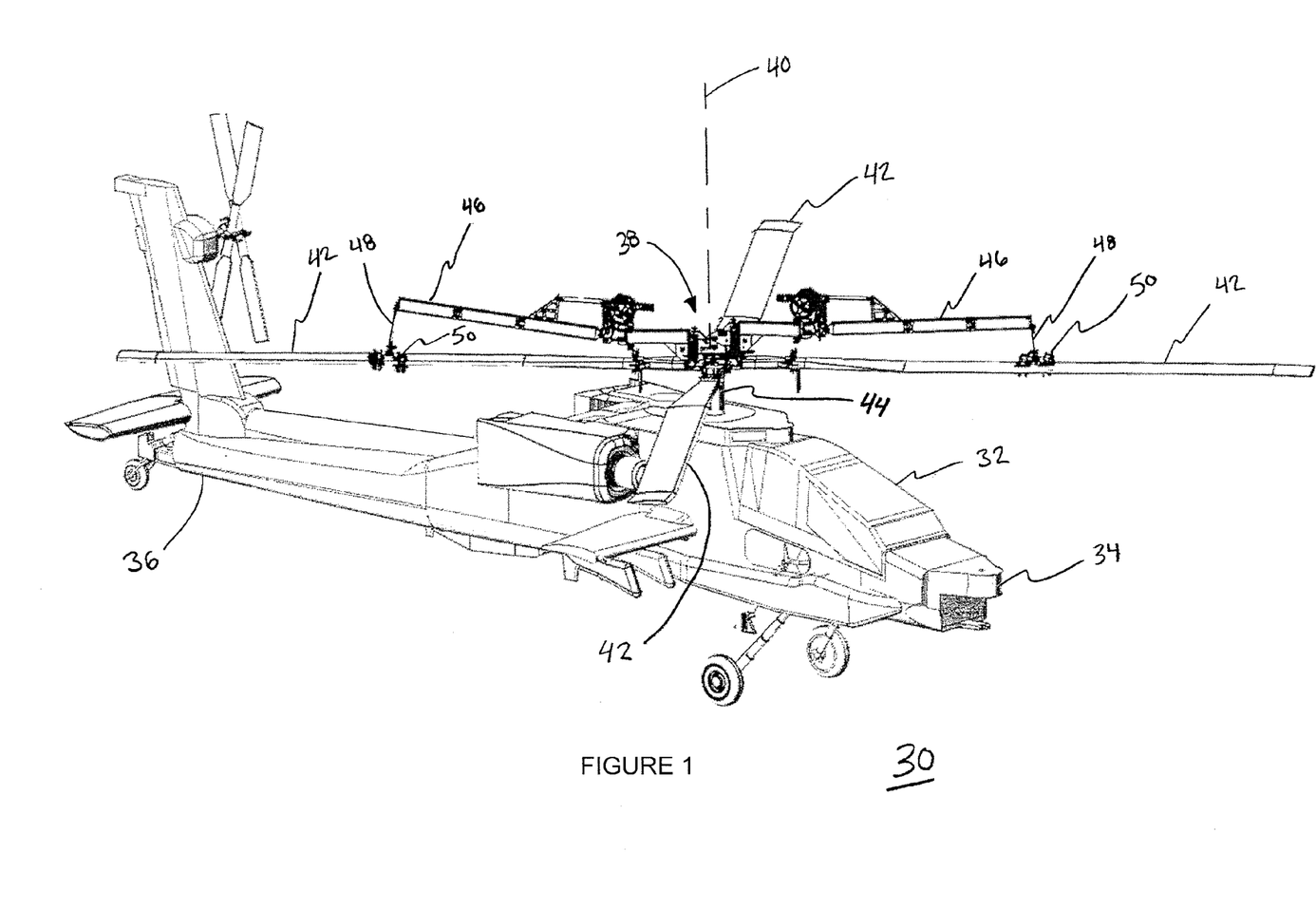
FIG. 1 is a perspective view of a helicopter, in this case for illustration, an Apache AH-64D with an embodiment of the presently described invention installed.

As depicted in FIG. 1, a helicopter 30 is comprised of a fuselage 32 that extends from the front end 34 to the tail section 36. A Main Rotor Assembly 38 extends vertically from the fuselage 32 and defines an axis of rotation 40. In the depicted exemplary embodiment, attached to the Main Rotor Assembly 38 are four Rotor Blades 42 and a Main Rotor Mast Assembly 44. Attached to the Main Rotor Mast Assembly 44 are the Blade Support Beam Assembly 46, the Beam Support Connecting rods 48, and two Blade Clamping devices 50. As depicted, the Blade Support Beam Assembly 46 includes two booms; however, more or less booms may be included as desired in alternative embodiments of the Blade Support Beam Assembly 46.

Figure 2:
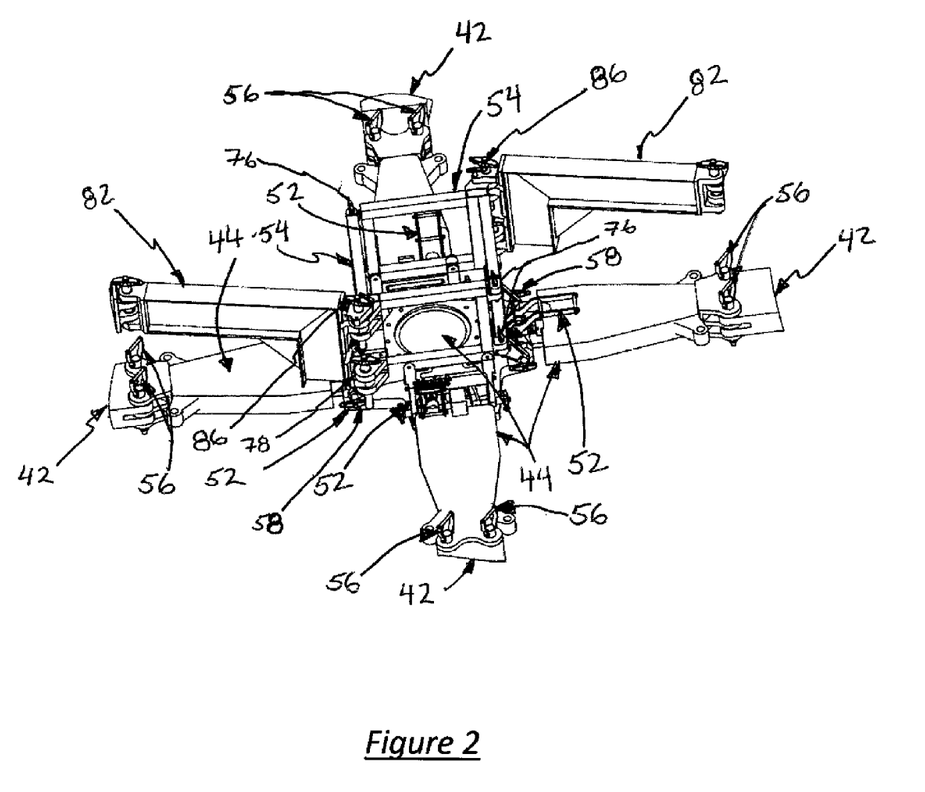
FIG. 2 is a perspective view of an embodiment of the Flap Lock System Components and the two-piece Overhead Lifting System Support Structure attached to the Flap Lock System and to representative Support Beam sections.

Referring now to FIG. 2, an exemplary apparatus for the installation and operation of four Flap Lock Assemblies 52 to the Main Rotor Mast Assembly 44 and Overhead Lifting System Support Structure 54 is herein described. Also shown are the Transport Blade Pins 56 at the root of each Main Rotor Blade 42 at the outward bounds of the Main Rotor Mast Assembly 44.

Figure 3:
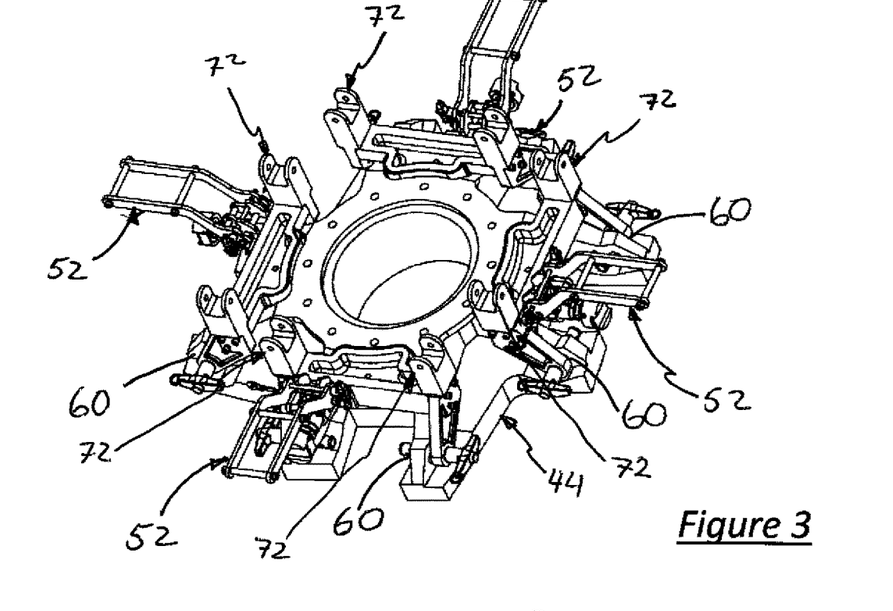
FIG. 3 is a perspective view of an embodiment of the four installed Flap Lock System Assemblies and a view of the helicopter rotor hub.
Figure 4:
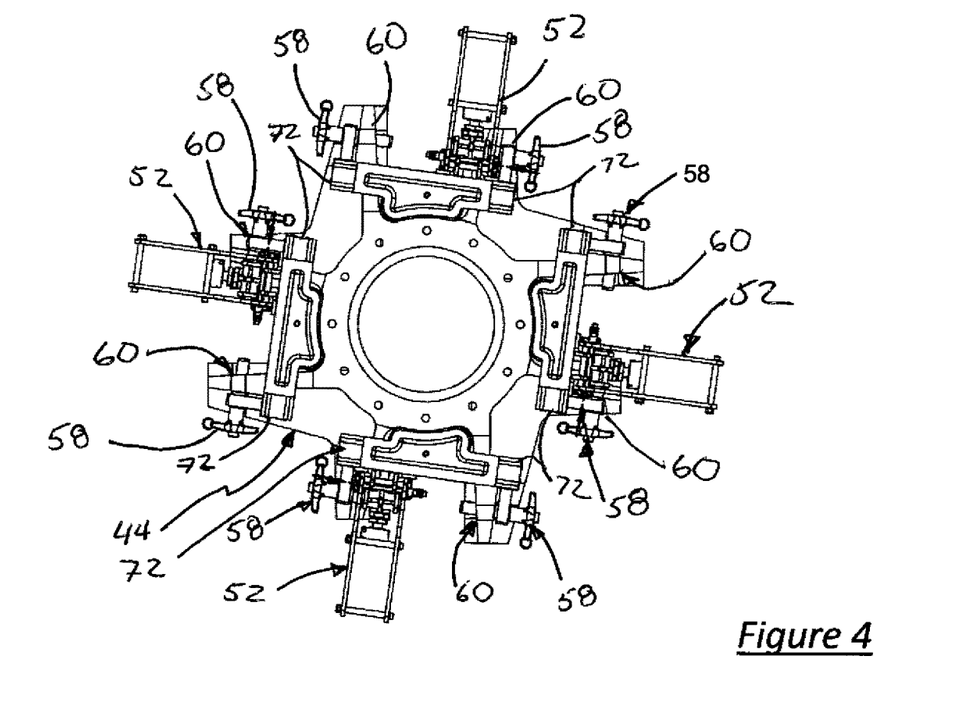
FIG. 4 is a vertical view of an embodiment of the four installed Flap Lock System Assemblies and helicopter rotor hub for added clarity.
Figure 5:
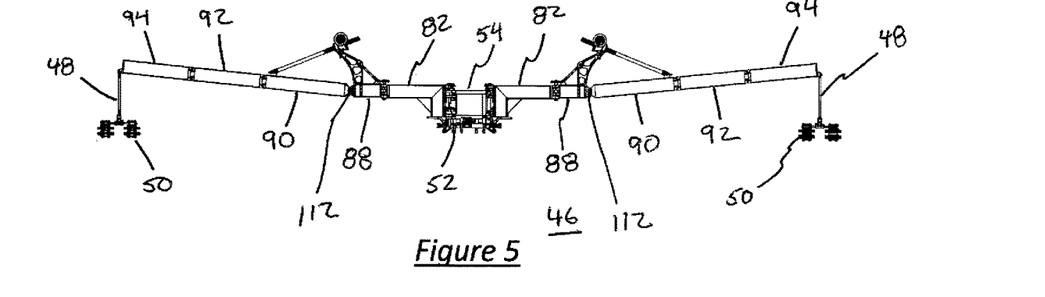
FIG. 5 is an assembled view of an embodiment of the two Blade Support Beam Sections fully assembled and ready to accept an appropriate blade clamping device.
Figure 6:
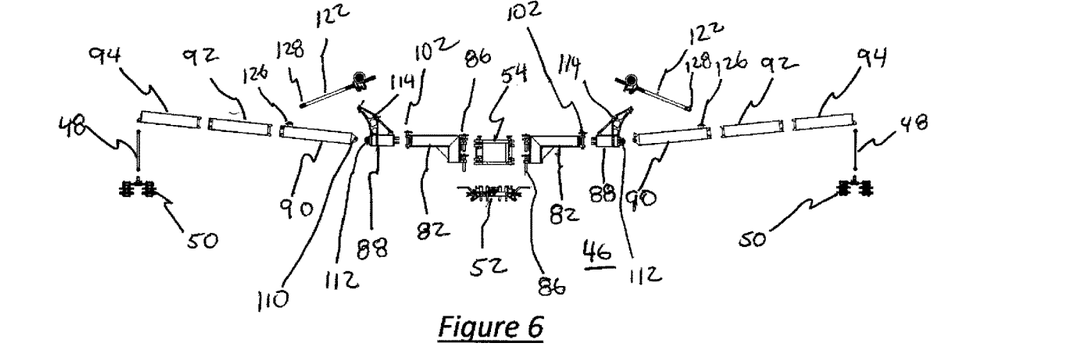
FIG. 6 is an exploded view of an embodiment of the two Blade Support Beam Sections in their proper order.
Figure 7:
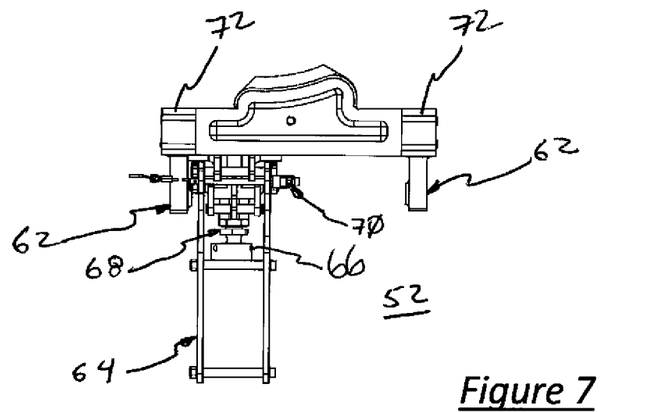
FIG. 7 is a vertical view of an embodiment of the Flap Lock Assembly, There may be four of these used in the preferred embodiment.
Figure 8:
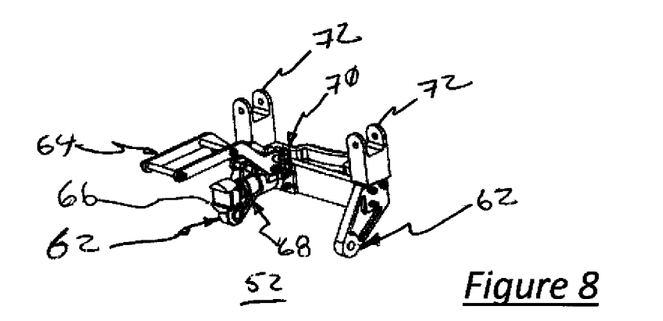
FIG. 8 is an isometric view of an embodiment of the Flap Lock Assembly
Figure 9:
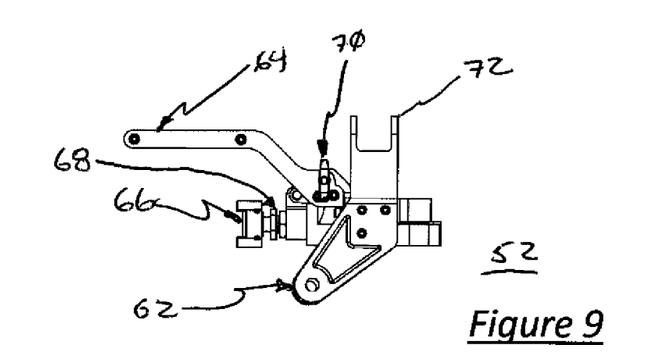
FIG. 9 is another side view of an embodiment of the Flap Lock Assembly for added clarity
Figure 10:
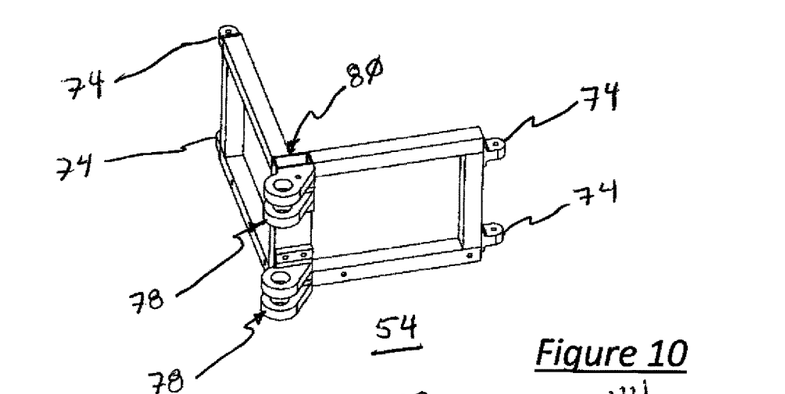
FIG. 10 is an embodiment of one of the two sections comprising the Overhead Lifting System Support Structure that attaches to the Flap Lock System.

In the illustrated embodiment, the four Flap Lock Assemblies 52 may be first attached to the Main Rotor Mast Assembly 44 using Quick-Lock pins 58 (as shown, two for each Flap Lock Assembly 52) after the helicopter pilot or operator returns the Main Rotor Blades 42 to their "zero" position. Each of the four Flap Lock Assemblies 52 may be attached to the existing lifting lug holes 60 (best illustrated in FIGS. 3 and 4) in the Main Rotor Mast Assembly 44 using quick lock pins 58. Referring to FIGS. 7, 8, and 9, installation of the four Flap Lock Assemblies 52 may be accomplished by placing each Flap Lock Assembly 52 in a position such that the lugs 62 are aligned with the Main Mast Rotor Assembly 44 lifting lug holes 60 with the Flap Lock Assembly Locking Handle 64 in the fully unlocked position (shown in FIGS. 7, 8, and 9 in the locked position). The operator may install Quick-Lock pins 58 through the aligned Flap Lock Assembly lugs 62 and the Main Rotor Mast Assembly lifting lugs 60. The operator may then adjust the Adjustable Flap Lock Piston 66 with the Locking Handle 64 in the fully unlocked position using any known tool in the art. Once the proper gap of the Adjustable Flap Lock Piston 66 is correctly set, the Adjustable Flap Lock Piston Lock Nut 68 may be tightened to prevent further movement of the Flap Lock Piston 66, and the Flap Lock Assembly Locking Handle 64 may be lowered into the locked position (lowered and locked position shown in FIGS. 3, 4 7, 8, and 9), and a Flap Lock Quick Lock Pin 70 may be inserted through the hole preventing the non-intentional release of the Flap Lock Assembly Locking Handle 64. With the four Flap Lock Assemblies 52 properly in place, vertical movement of the Main Rotor Blades 44 is restricted.

Referring now to FIGS. 2, 3, 4, and 10 of the illustrated exemplary embodiment, the two Overhead Lifting System Support Structures 54 may be installed directly on the four Flap Lock Assemblies 52. Each Overhead Lifting System Support Structure 54 may be placed into the guides between the mounting lugs 72 on the Flap Lock Assemblies 52 such that holes in each of the tabs 74 of the Overhead Lifting System Support Structure 54 are aligned with the holes in the mounting lugs 72 of the Flap Lock Assembly 52. The two Overhead Lifting System Support Structures 54 may be designed in such a manner to interlock all of the tabs 74 within the lugs 72. When all of the lugs 72 and the tabs 74 are aligned, four Quick Lock Pins 76 may be inserted into and through the aligned Flap Lock Assembly lugs 62 and Overhead Lifting System Support Structure tabs 74, thereby securing the two Overhead Lifting System Support Structures 54 to the Flap Lock Assemblies 52. The Overhead Lifting System Support Structures 54 may also include heavy lug features 78 in each corner 80. These heavy lug features 78 are properly aligned to accept the Blade Support Beam Assemblies 46. While the illustrated embodiment utilizes two Overhead Lifting System Support Structures 54 that are installed on the Flap Lock Assemblies 52, in alternative embodiments, other overhead lifting support structures may be used to provide an interface between the aircraft rotor head and the lifting system. For example, an alternative embodiment may include four overhead lifting system support structures may be used such that each Flap Lock Assembly is connected to an individual overhead lifting system support structure.

Further assembly of the illustrated embodiment may be accomplished by attaching the Proximal Section 82 of Blade Support Beam Assembly 46 (as shown in FIG. 2) to the Overhead Lifting System Support Structures 54. This may be accomplished by placing the tabs 84 of the Proximal Section 82 of the Blade Support Beam Assembly 46 into the lugs 78 of the Overhead Lifting System Support Structures 54 and securing the tabs 84 in place using Quick Lock Pins 86. This provides the secure support base for the rest of the Blade Support Beam Sections 88, 90, 92, and 94. The Blade Support Beam Assembly 46 is able to rotate about the axis created by the tabs 84 and the lugs 78 using the pins 86. This allows the entire Blade Support Beam Assembly 46 to be positioned correctly and directly over the Helicopter Main Rotor Blades 42 for connection using the Blade Attachment Rod 48 and a suitable Blade Clamping Mechanism 50. The Proximal Section 82 of the Blade Support Beam Assembly 46 is preferably designed with a proper length support beam 96 and an additional set of tabs 98, Quick Lock Pins 102 for securing to lugs 100 fitted with bushings 104 on the Blade Support Beam Section 88. This ensures that during the Blade Folding Process the geometries remain correct, i.e., all radii required for proper pivoting of Rotor Blades 42 are correct to pivot around a single Blade Pin 56 without the introduction of additional loads to those Blade Pins 56.

Figure 11:
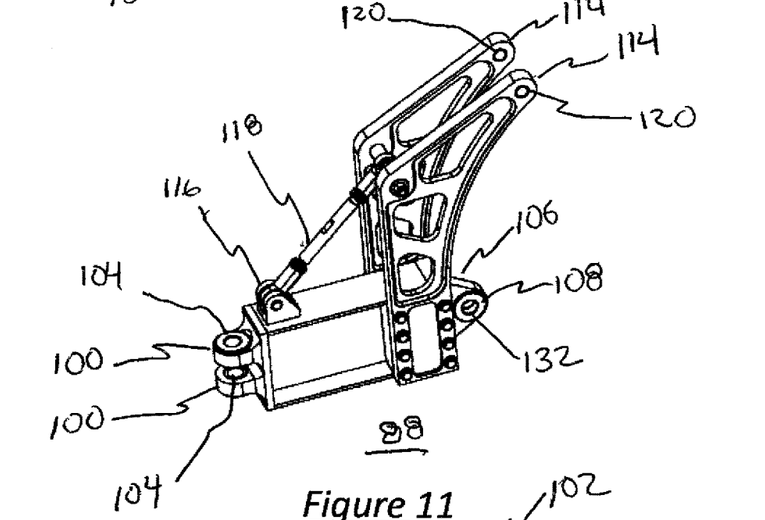
FIG. 11 is a view of an embodiment of Section 2 of 5 of the Blade Support Beam Assembly. This section may be comprised of a beam section and support mechanism for the vertical axis adjustment mechanism for each Beam.
Figure 12:
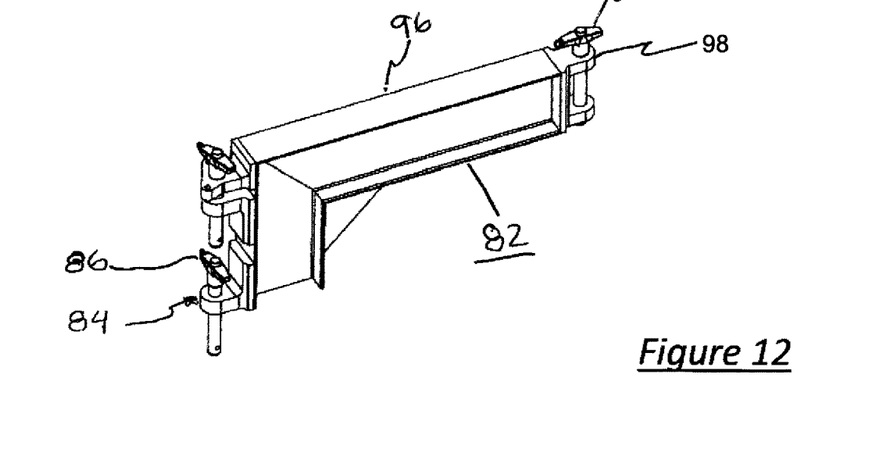
FIG. 12 is a view of an embodiment of Section 1 of 5, the inner-most section of the Blade Support Beam Assembly. This section may be attached to the Overhead Lifting System Support Structure using quick release pins.
Figure 13:
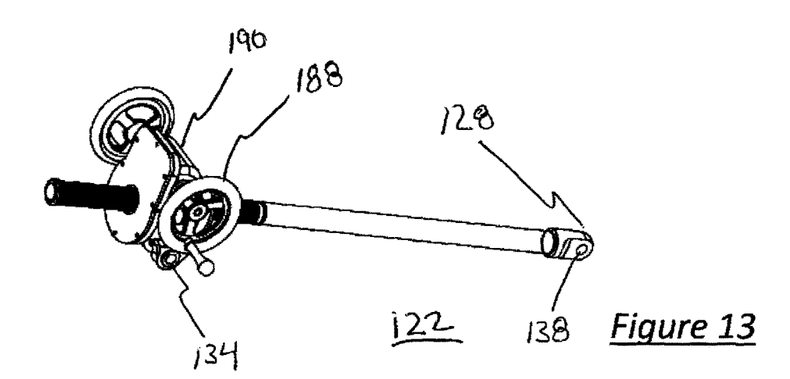
FIG. 13 is a view of an embodiment of a Beam Height Adjustment Mechanism that may be used on each of the two Blade Support Beams and attached on one end to Section 2 of 5 and the other end attached to Section 3 of the Support Beams.
Figure 14:
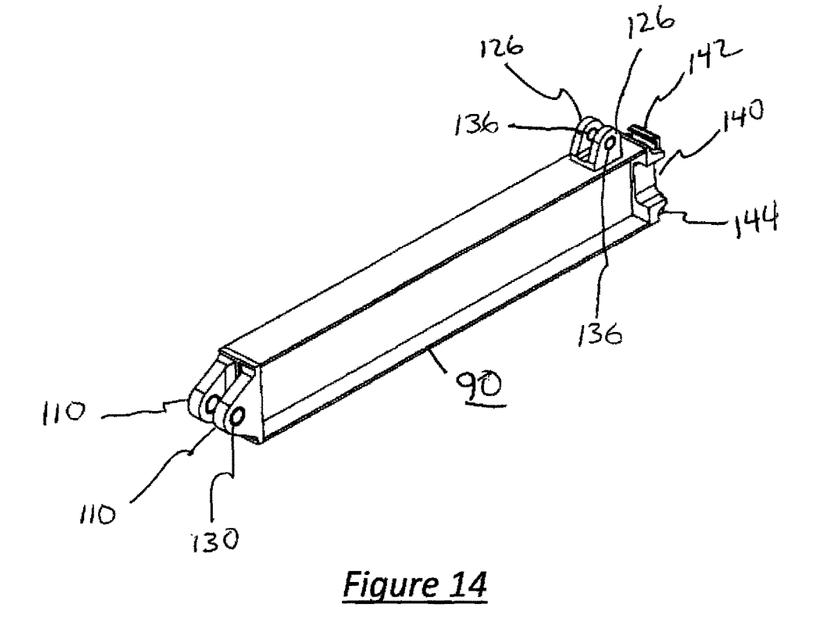
FIG. 14 is a view of an embodiment of Section 3 of 5 of one of the two Blade Support Beams including the attachment lug for the lower end of the Beam Height Adjustment Mechanism.

The Blade Support Beam Section 88 may, for example, include horizontal lugs 100 and bushings 104, as well as a tab 106 with bushing 108 (FIG. 11) to provide for a vertical lifting capability to the rest of the Blade Support Beam Assembly 46, the Blade Attachment Rod 48, and Blade Clamping Mechanism 50. The tab 106 may interface with the Blade Support Beam Section 90 at the lugs 110, and may be attached with a Quick Lock Pin 112. The Blade Support Beam Section 88 may also, for example, include Adjustment Support Brackets 114, a Support Turnbuckle 118 and a Support Attachment Lug 116. These may be preassembled on the Blade Support Beam Section 88 and are, in certain embodiments, non-adjustable once assembled. The Adjustment Support Brackets 114 contain mounting holes 120 to accept the Blade Support Beam Assembly Vertical Adjustment Mechanism 122.

Blade Support Beam Section 90 may be attached to the Blade Support Beam Section 88 using a Quick Lock Pin (not shown) similar to those used throughout this embodiment of the invention. This may be accomplished by inserting tab 106 of the Blade Support Beam Section 88 into lugs 110 of the Blade Support Beam Section 90, aligning the holes 130 and 132 and inserting the appropriate Quick Lock Pin therethrough. While the pieces of the illustrated embodiment of the invention may be secured together using Quick Lock Pins, it is understood that other fasteners would also be appropriate to perform the same function.

The Blade Support Beam Assembly Vertical Adjustment Mechanism 122 may then be assembled between the Blade Support Beam Section 88 and the Blade Support Beam Assembly 90. The top section of the Blade Support Beam Assembly Vertical Adjustment Mechanism 122 may be attached to the Adjustment Support Brackets 114 by aligning the holes 120 and 134 and using a Quick Lock Pin (not shown). The bottom section of the Blade Support Beam Assembly Vertical Adjustment Mechanism 122 may be attached to the lugs 126 of the Blade Support Beam Section 90 through the use of tab 128 of the Blade Support Beam Assembly Vertical Adjustment Mechanism 122 by aligning a hole 136 on the tab 126 with a hole 138 on the tab 128 and inserting the appropriate Quick Lock Pin (not shown).

Figure 15:
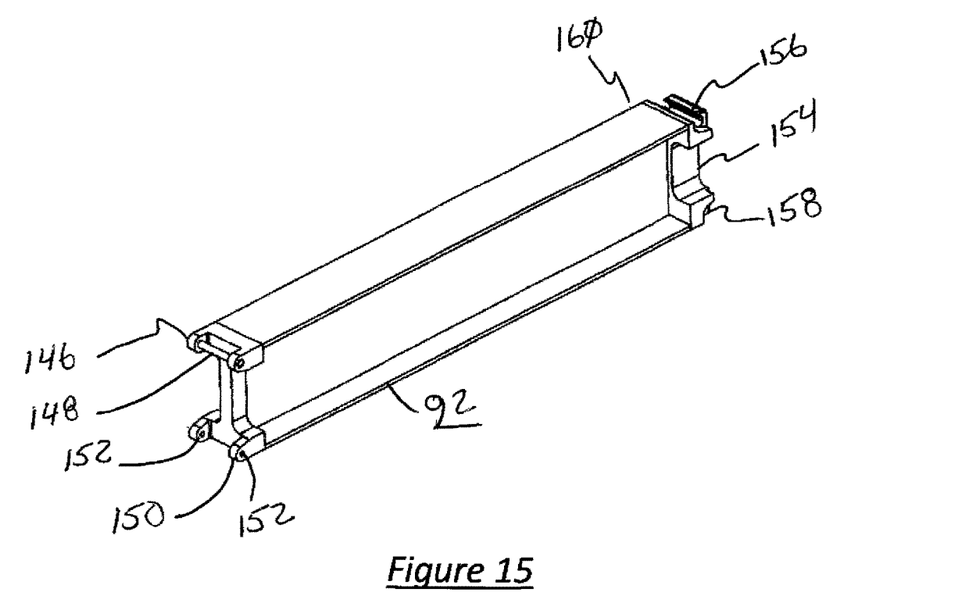
FIG. 15 is a view of an embodiment of Section 4 of 5 of one of the two Blade Support Beams including the section-to-section interlock system.
Figure 16:
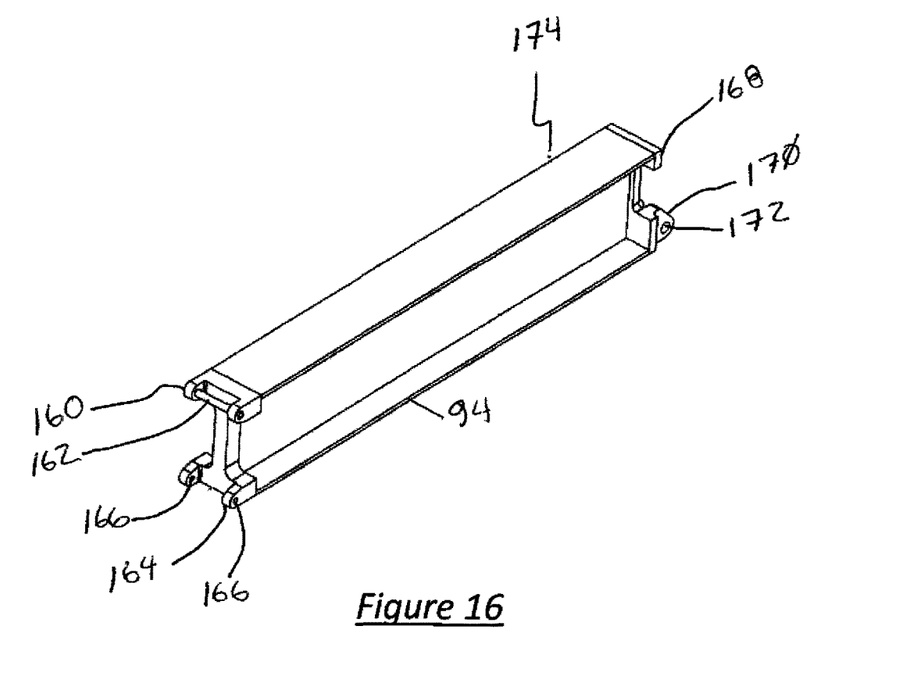
FIG. 16 is a view of an embodiment of Section 5 of 5 and the outermost section of one of the two Blade Support Beams including the section-to-section locking mechanism and the lug for attachment of the Blade Attachment Rod.
Figure 17:
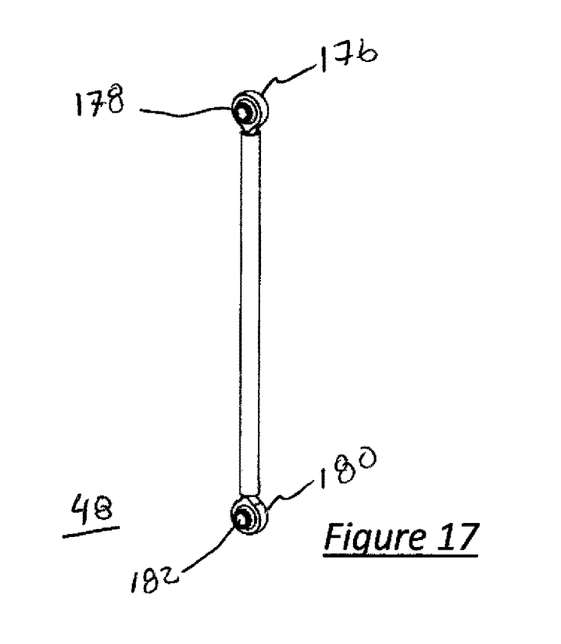
FIG. 17 is a view of an embodiment of the Blade Attachment Rod. There may, for example, be one of these used on each of the two Blade Support Beams and attach to Section 5 of the Beam on the upper end, and the Blade Clamping Device on the lower end of the Rod.

The Blade Support Beam Assembly 46 may be quickly assembled while on the helicopter as each section is constructed to be as lightweight as possible, easily carried and maneuverable by a single person. To facilitate ease of construction of the Blade Support Beam Assembly 46, interfaces between each section 82, 88, 90, 92 and 94 may be accomplished without tools and with the use of Quick Lock Pins or other fasteners as described throughout herein. A receiving lug 140 may be attached to the distal end of the Blade Support Beam Assembly Section 90. The receiving lug 140 may include a lip 142 and a tab 144 with a hole (not shown). A plate 146 may be attached to the proximal end of the Blade Support Beam Assembly Section 92 (FIG. 15). The plate 146, which may include a pin 148, lugs 150 and holes 152, complements the receiving lug 140 of the Blade Support Beam Assembly Section 90. The operator may attach the Blade Support Beam Assembly Section 92 to the Blade Support Beam Assembly Section 90 by lifting the distal end 160 sufficiently to engage pin 148 into the lip 142 of the Blade Support Beam Assembly Section 90, then lowering the far end 160 of the Blade Support Beam Assembly Section 92 until the holes 150 of the Blade Support Beam Assembly Section 92 line up with the holes in the tab 144 of the Blade Support Beam Assembly Section 90, and inserting the appropriate Quick Lock Pin (not shown). This provides positive registration and sufficient strength to assimilate a single piece beam assembly while allowing for modular, lightweight construction.

A similar method may be used to attach the Blade Support Beam Assembly Section 94 to the Blade Support Beam Assembly Section 92. The Blade Support Beam Assembly Section 94 is the most distal and final section of the illustrated embodiment of the Blade Support Beam Assembly 46. In a similar fashion to the attachment of Blade Support Beam Assembly Section 92 to Blade Support Beam Assembly Section 90, the operator will lift the distal end 174 of the Blade Support Beam Assembly Section 94 until a pin 162 fully engages with the lip 156 of the Blade Support Beam Assembly Section 92, then lowers the distal end 174 of the Blade Support Beam Assembly Section 94 until the holes 166 in the lugs 164 of the plate 160 line up with the holes in tab 158 of plate 154 of the Blade Support Beam Assembly Section 92, and insert the appropriate Quick Lock Pin (not shown) to secure in place.

Figure 18:
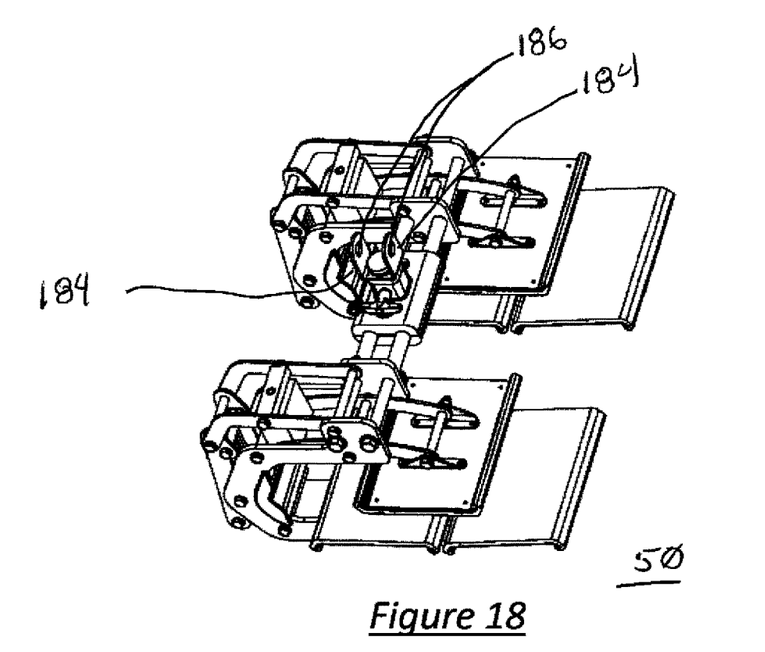
FIG. 18 is a view of an embodiment of a blade clamping mechanism.

The Blade Attachment Rod 48 may include, for example, at a first end, a lug 178 having a hole 176 therethrough, and, at a second end, a lug 180 having a hole 182 therethrough. To attach the Blade Attachment Rod 48 to the Blade Support Beam Assembly 46, a user may align the hole 178 on the lug 176 to the holes 172 on the lugs 170 on the distal end of the Blade Support Beam Assembly Section 94 and inserting the appropriate Quick Lock Pin therethrough. The operator may also attach an appropriate Blade Clamping Mechanism 50 (an example of which is shown in FIG. 18) by aligning the holes 186 of the Blade Clamping Mechanism 50 with the hole 182 in the lug 180 of the Blade Attachment Rod 48 and inserting the appropriate Quick Lock Pin.

The assembly of one entire side of the Blade Support Beam Assembly 46 is depicted as complete. While the embodiment described includes five sections that may make up the Blade Support Beam Assembly 46, it should be understood that more or less sections may be used as desired. The operator may also duplicate this assembly procedure for the other side of the subject Helicopter 30 prior to folding Main Rotor Blades 42.

The use of an embodiment of the invention will now be described. Preferably, a team would, for example, build and attach to the Overhead Lifting System Support Structure 54 both sides of the Blade Support Beam Assembly 46 after attaching all of the components of the Flap Lock System 52 and the Overhead Lifting System Support Structure 54. Once complete, the team performing the blade fold would rotate the Blade Support Beam Assembly 46 about the pins 86, the tabs 84, and the lugs 78 until the Blade Support Beam Assembly 46 is aligned over the rearward of the Main Rotor Blades 42 of each side first and then the forward Main Rotor Blades 42 second. Once the Blade Support Beam Assembly 46 is aligned to a Main Rotor Blade 42, a locking mechanism associated with pins 86, the tabs 84, and the lugs 78 may be engaged to disallow any further rotation of the Blade Support Beam Assembly 46 at the junction of the Overhead Lifting System Support Structure 54 and the Blade Support Beam Assembly Section 82. This changes the center point of the Blade Support Beam Assembly 46 swing radius from pin 86 to pin 102, tabs 98 and the lugs 100 to coincide with the blade pins 56 at the root of the Main Rotor Blade 42 to be folded (FIG. 2). The Blade Clamping Mechanism 50 may then engage the Main Rotor Blade 42 at its longitudinal CG. The process of relieving all stress loads at the root of the Main Rotor Blade 42 may be accomplished by then rotating the handle 188 of the Blade Support Beam Assembly Vertical Adjustment Mechanism 122 causing the worm gear assembly 190 to actuate lead screw 192 in the appropriate direction to raise the end of the Blade Support Beam Assembly 46 through its coupling at lug 126 on the Blade Support Beam Assembly Section 90. This action in turn raises (or lowers as appropriate to remove adverse loads) the Blade Attachment Rod 48 and the Blade Clamping Mechanism 50 to the appropriate position quickly and easily. Once the loads have been removed, the Flight Blade Pins (not shown) may be removed and replaced with Transport Pins 56 or other mechanisms required for the folding of the Main Rotor Blades 42. This invention, in addition to providing a position by which the Main Rotor Blades can be secured in the proper position to easily remove the Blade Pins 56 from the Helicopter Main Rotor Blades 42, can be used to rotate the blades about lugs 98 of Proximal Section 82 of Blade Support Beam Assembly 46 and lugs 100 of Blade Support Beam Section 88 of Blade Support Beam Assembly 46 and pins 86 rearward or forward to accomplish a complete blade fold using the appropriate secondary tools and fixtures.

All of the apparatus and methods disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A helicopter rotor blade folding apparatus for the positioning of a rotor blade attached to a main rotor mast assembly of a helicopter main rotor assembly via at least one blade pin having a vertical axis of rotation, comprising:
    at least one flap lock mechanism removably attachable to the main rotor mast assembly, wherein the at least one flap lock mechanism is configured to restrict the flap of the rotor blade when attached to the main rotor mast assembly;
    at least one overhead lifting system support structure removably attachable to the flap lock mechanism;
    a rotor blade support beam assembly comprising at least one overhead beam having a first end and second end, said first end of said overhead beam is removably attachable to the overhead lifting system support structure;
    an overhead beam support connecting rod having a first send and a second end, said first end of said overhead beam support connecting rod attached proximate to the second end of the rotor blade support beam assembly; and
    a blade clamp adapted to temporarily attach to the rotor blade, said blade clamp removably attachable to the second end of said overhead beam support connecting rod.

2. The helicopter rotor blade folding apparatus of claim 1, wherein said at least one overhead beam has two independent degrees of freedom.

3. The helicopter rotor blade folding apparatus of claim 1, wherein said at least one overhead beam is rotatable about the vertical axis of rotation of the at least one blade pin.

4. The helicopter rotor blade folding apparatus of claim 1, wherein the blade support beam assembly comprises at least two overhead beams.

5. The helicopter rotor blade folding apparatus of claim 1, wherein the at least one overhead beam comprises a first beam section and second beam section, said first and second beam sections each having respective first and second ends, wherein said second end of said first beam section is attached to said first end of said second beam section.

6. The helicopter rotor blade folding apparatus of claim 5, wherein the rotor blade support beam assembly further comprises a vertical adjustment mechanism that is configured to raise or lower said second end of said second beam section with respect to said second end of said first beam section.

7. A method for folding a rotor blade attached to a main rotor mast assembly of a helicopter main rotor assembly via at least one blade pin having a vertical axis of rotation comprising:
    attaching a flap lock mechanism to the main rotor mast assembly;
    assembling at least one overhead lifting system support structure;
    mounting said at least one overhead lifting system support structure on the flap lock mechanism;
    assembling a rotor blade support beam assembly, said blade support beam assembly comprising an overhead beam;
    mounting the rotor blade support beam assembly on the overhead lifting system support structure;
    mounting a blade clamp to the overhead beam;

rotating the blade support beam assembly until the overhead beam and the blade clamp is aligned over the rotor blade;
releasably attaching a blade clamp to the rotor blade; and
transporting the blades rearward or forward to accomplish a complete blade fold.

8. The method of claim 7, wherein once the overhead beam is aligned over the rotor blade, employing a locking mechanism to prevent any further rotation of the blade support beam assembly.

9. The method of claim 7, wherein the blade clamp is releasably attached to the longitudinal center of gravity of the rotor blade.

10. The method of claim 7, further comprising using a vertical adjustment mechanism to raise or lower the blade clamp prior to rotating the blade support beam assembly.

\* \* \* \* \*